United States Patent [19]

Feller

[11] 4,388,003
[45] Jun. 14, 1983

[54] HEAT-METER AND FLOW-METER APPARATUS

[75] Inventor: Murray F. Feller, Dunnellon, Fla.

[73] Assignee: Wilgood Corporation, Dunnellon, Fla.

[21] Appl. No.: 258,521

[22] Filed: Apr. 29, 1981

[51] Int. Cl.³ .................... G01F 1/86; G01K 17/16
[52] U.S. Cl. ................................. 374/41; 73/861.03
[58] Field of Search .................. 73/861.03; 364/510, 364/557; 374/40, 41

[56] References Cited

U.S. PATENT DOCUMENTS 3,802,261  4/1974  Zimmerman et al. ........... 73/861.03
3,831,011  8/1974  Hulme ............................ 73/861.03
4,224,825  9/1980  Feller .................................. 374/41

FOREIGN PATENT DOCUMENTS 2531922  2/1976  Fed. Rep. of Germany ........ 374/41

OTHER PUBLICATIONS

Friedl et al., "A New Resistance to Frequency Converter for Temperature Measurements in Calorimeters", IEEE Trans. on Inst. and Meas., vol. IM 24 #4, pp. 322–324, 12/75.

Primary Examiner—Herbert Goldstein

[57] ABSTRACT

The disclosed apparatus includes a heat meter and a flow meter. The heat meter includes means for delivering trains of pulses to a heat register, the pulses per train being proportional to the temperature difference between fluid inlet and outlet passages of heat exchange means, and the recurrence rate of the pulse trains being determined by a flow sensor. A visual indicator of the pulse trains facilitates zero-difference adjustment of the temperature sensors when they are both at the same temperature. Compensation for variations in the specific heat of the fluid and temperature-related inaccuracy of the flow sensor is effected by non-linear frequency adjustment of an oscillator that generates the pulses. In a flow meter (omitting the temperature-difference circuit) compensation for temperature-related inaccuracy of flow-sensors is effected correspondingly.

6 Claims, 1 Drawing Figure

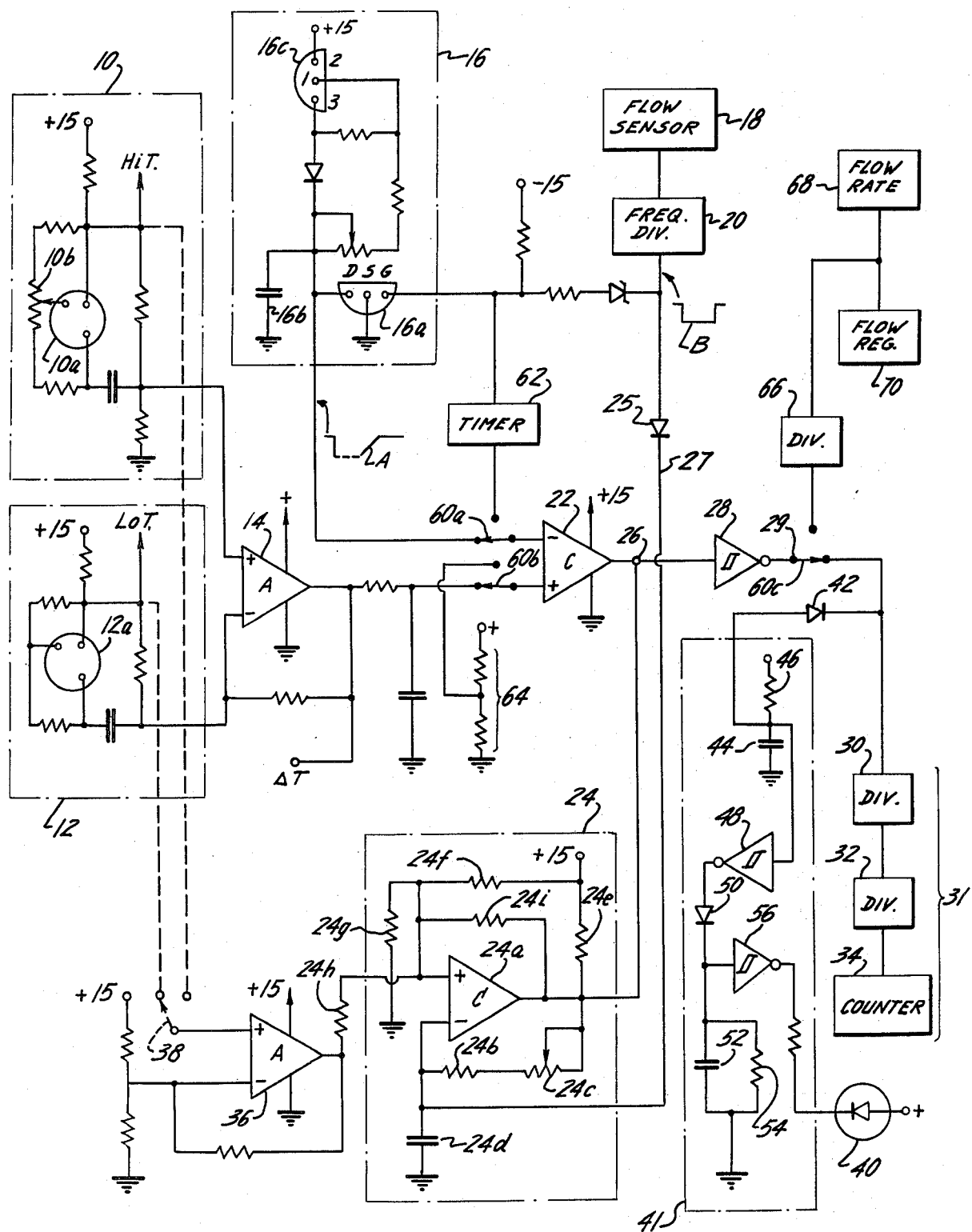

HEAT-METER AND FLOW-METER APPARATUS

The present invention relates to apparatus for metering the heat supplied to or delivered from heat-exchange means between inlet and outlet passages, and to flow-metering apparatus.

In one aspect, the present invention is an improvement on my U.S. Pat. No. 4,224,825 issued Sept. 30, 1980 which relates to heat meters. That patent discloses inlet and outlet temperature sensors and means for taking the difference between those temperatures, a flow sensor that emits electrical pulses corresponding to fluid-induced operation of a rotor, a ramp generator that is triggered by flow-sensor pulses, a high-frequency oscillator, a register, and temperature-difference-controlled gating means that determines the number of oscillator pulses that are entered into the register. To the extent applicable, and in the interest of brevity, the disclosure in that patent is incorporated herein by reference.

As disclosed in detail in that patent, the temperature sensors are matched, and they are in respective circuits such that the output of each sensor varies linearly with (in proportion to) temperature and varies in the same magnitude over the operative temperature range. An object of the present invention resides in providing an indicator to evidence match of the outputs of the inlet and outlet temperature sensors when they are at the same temperature, thereby facilitating adjustment. A related object of the invention resides in providing a single indicator for checking both the operation of the flow sensor and matching adjustment of the temperature sensors. Using such an indicator, one of the temperature sensors can be adjusted, as necessary, to equal the output of the other at a given temperature. This adjustment can be checked both at the factory and at the point of use from time to time.

In making the adjustment, the two temperature sensors are exposed to the same temperature. When the sensors are adjusted to produce next-to-zero net output, only one or two high-frequency oscillator pulses are emitted during each triggered ramp. An indicator is provided, ideally a light source, at the point in the apparatus where the succession of pulse trains enters the circuit of the heat meter or register. This indicator is "on" at intervals when there is a temperature difference and when the fluid is flowing. When the inlet and outlet temperature sensors are at the same temperature, one of the temperature sensors is adjusted so that output of a temperature-difference means accurately equals zero as evidenced by extinction of indicator output.

The same indicator is also useful in checking the operation of the flow meter since the frequency of indicator operation, especially light bursts, represents the rate of operation of the flow-meter's rotor.

Accuracy of the temperature-sensor adjustment is dependent on the sensitivity of the indicator. For enhanced sensitivity, the oscillator in the apparatus is operated at a high frequency (much higher than needed for registering heat units in the heat-unit counter that displays heat units) and the indicator is connected at or near the highest-frequency point in the circuit of the divider-and-counter circuit. Adjusting a temperature sensor to extinction of a high-frequency pulse gives more precise results than the same adjustment at low frequencies.

With spaced-apart short-duration pulses to the indicator, each pulse or brief pulse train may not keep the light source or other indicator "on" long enough to be noted. Observation of the "on" condition can better be assured by switching the indicator "on" for a substantially longer time interval than the duration of a high-frequency pulse, as by triggering "on" a monostable indicator-actuating device. Here that purpose is realized effectively by incorporating a pulse extender.

In my patent, a ramp signal is used in taking the product of the inlet-outlet temperature difference and the number of pulses from the flow meter. There the start of the ramp coincides with the discharge of a capacitor in the ramp generator. An object of the present invention resides in improving the accuracy of such apparatus, which is here accomplished by discharging the capacitor in a preparatory operation, followed by separately initiating the ramp. In this way there is no need to speculate on the theoretical accuracy of full discharge of the ramp-generating capacitor and the truly concurrent start of the ramp. This change is implemented in part by blocking the oscillator signal until the ramp is initiated.

In my patent mentioned above, it was noted that, while the register's reading of delivered (or extracted) heat depends mainly on the product of the temperature difference and the number of pulses from the flow sensor, the operation is also affected by the non-linearly varying specific heat of the fluid and by the temperature-dependent variations in the rate of operation of the flow sensor. A form of compensating means for the latter factors was provided in my patent. Another object of the present invention resides in providing novel and improved means for introducing compensation into the heat-metering circuit for temperature-dependent variations in the operation of the flow sensor and for variations in the specific heat of the fluid, especially water. Noting that there are two factors in the product-taking operation of the heat meter—temperature difference and flow rate—it may be said that the compensation corrects for variations in the flow sensor's response to the temperature-dependent variations in the mass-flow rate of the fluid.

In the novel heat meter, the oscillator which produces high-frequency pulses operates at a frequency that varies in dependence on one of the temperature sensors, particularly the temperature sensor at the flow sensor. The relationship between the signal derived from the temperature sensor and the frequency of the oscillator can be made to be a non-linear function that matches quite accurately the temperature-dependent variations of the flow sensor in sensing the mass rate of flow of the water or other fluid.

In one aspect of the present invention, improved accuracy of the heat meter is provided by introducing compensation for temperature-dependent inaccuracies of the flow meter. A further object of the present invention resides in providing flow meters with the same kind of compensation for temperature-dependent variations in volume-flow and mass-rate-of-flow.

BRIEF DESCRIPTION OF THE DRAWING

The accompanying drawing is a wiring diagram showing a presently preferred yet illustrative embodiment of the present invention in its various aspects. Those components in the drawing that are not specifically mentioned below are to be regarded as incorporated in the description in accordance with their conventional symbols.

ILLUSTRATIVE EMBODIMENT

In the drawing, high-temperature sensor 10 and low-temperature sensor 12 are installed in intimate temperature-transfer relation to inlet and outlet fluid passages, especially in a circulating water system supplied by a furnace (for example) to heat-exchange means such as radiators, or a hot-water supply system including a heater such as a solar heater. The high and low temperature sensors are connected to the (+) and (−) input terminals, respectively, of differential amplifier 14, here an operational amplifier. Temperature sensing elements 10a and 12a in temperature sensors 10 and 11 are, for example, integrated circuit elements LM 135. The temperature sensors are adapted to produce an output voltage that varies linearly with temperature, e.g. varying from about 2.73 volts to 3.73 volts in proportion to a temperature range of 0°C. to 100° C. The output of amplifier 14 may vary, with this 0 to 1-volt input differential, over a range of 0 volts to 10 volts.

A ramp signal generator is periodically triggered by a pulse from flow-detector 18, preferably via frequency divider 20. Flow detector 18 includes a flow-activated rotor. It may assume many forms, designed to produce output pulses in proportion to the volume of fluid flow. The ramp generator 16 here includes a junction field-effect transistor 16a, a capacitor 16b and a constant-current generator 16c, all as described in my patent mentioned above. While transistor 16a has "high" input, it discharges capacitor 16b and maintains the capacitor discharged. This results from "high" intervals in the rectangular wave of the divider. With "low" divider output, transistor 16a is rendered non-conducting. The ramp signal is promptly started as capacitor 16b starts to charge through its constant-current source 16c. While divider 20 maintains transistor 16a conducting, the divider also acts via blocking diode 25 and connection 27 to maintain capacitor 24d of oscillator 24 charged, blocking the oscillator.

Signals A from ramp generator 16 and the output of differential amplifier 14 are supplied to the (−) and (+) inputs, respectively, of comparator 22 whose output shifts between "high" and "ground". For zero temperature difference, the voltage at the (+) input of comparator 22 matches the discharge voltage of capacitor 16b, this being the downward peak of the truncated sawtooth wave A. When the output of divider 20 shifts "high", connection 27 through blocking diode 25 blocks oscillator 24.

When the output of divider 20 goes "low", oscillator-blocking connection 27 has no further effect. If the temperature difference between the inlet and outlet passages is small, then comparator 22 yields an enabling or gating bias for signals of oscillator 24 at terminal 26 during only a short time interval. The "on" time interval of the gate and the length of oscillator pulse trains increase linearly with the temperature difference. Oscillator pulses are provided by inverting Schmitt trigger 28 at output terminal 29.

Thus far, it is apparent that the output of oscillator 24 is enabled or gated "on" during each truncated sawtooth wave for a time interval that is proportional to the inlet-outlet temperature difference, and the number of truncated saw-tooth pulses is primarily proportional to the fluid flow. Consequently the total number of oscillator pulses at terminal 29 is proportional to the product of the flow rate, and the temperature difference. Where the specific heat is taken into account, this pulse-train total also represents the heat units extracted from the fluid between the inlet and the outlet in case of a heating system, as well as the heat units added to the fluid in case of a solar hot-water heating system or a room- or apartment cooling system. This output is delivered to a BTU register 31 comprising successive frequency dividers 30 and 32 and BTU counter 34. The dividers are chosen to make counter 34 read directly in BTU units.

One of the temperature sensing elements 10a or 10b is installed at the flow sensor, which is advantageously located in the return line in the case of a circulating hot-water heating system.

The actual numbers of BTU's that are registered by the system thus far described depends importantly on the specific heat of the water whose volume is measured by operation of flow sensor 18. The specific heat of water varies non-linearly with the water temperature. The disclosed apparatus provides a means for compensating for this non-linearity and for other temperature-related factors that cause the flow sensor's signals to deviate from actual volume-flow or mass-flow of the water or other fluid.

A signal from the flow sensor's temperature sensor provides input bias to operational amplifier 36. The selection option is diagrammatically illustrated by selection means 38 having dotted-line connections to the two temperature sensors. For example, the input to amplifier 36 is taken from the low-temperature sensor whose sensing element 12a is installed at the fluid-flow sensor. The output of amplifier 36 is a proportionally amplified representation of the temperature sensor's output, thus proportional to temperature change. Where this linear voltage is impressed on oscillator 24, the variation of oscillator frequency can be made non-linear in virtually the exact manner that specific gravity is a non-linear function of temperature. The same compensation can take into account additional temperature-induced deviations of the flow sensor from proportional response to flow a different temperatures. The manner of non-linear (non-proportional) variation of oscillator frequency with changing output of amplifier 36 is discussed below.

Indicator

Temperature sensors 10 and 12 are chosen to have near-identical output variations, proportional to temperature. There should be zero output from comparator 14 and there should be no oscillator pulses at point 26 in the circuit when the two sensors are at the same temperature. The present apparatus includes built-in means for determining that this is true, useful both at the factory for calibration and at the point of use for verification and for corrective adjustment. In making a test, both temperature sensing elements may be immersed in the same volume of water to be at the same temperature, and a flow-simulating signal is supplied to ramp generator 16. An adjustable resistor 10b in temperature sensor 10 is then adjusted from a no-output condition at terminal 26 until output pulses just start to appear or the resistor may be adjusted until the output pulses just disappear. This is evidenced by an LED indicator 40 that provides light flashes in response to input voltage pulses or pulse trains, acting through pulse extender 41.

For maximum sensitivity and precision, the temperature-sensor adjustment is made by monitoring the signals at the highest-frequency part of the system, i.e. at terminal 29 where trains of pulses of oscillator frequency appear when there is an inlet-outlet temperature-difference signal and when fluid flows. While the signals appearing at points along the frequency-divider channel 30, 32 are longer in duration than the pulses at terminal 26 or 29, many oscillator pulses may be required to produce each frequency-divided signal. Thus, monitoring the signals developed along the divider channel would represent a loss of sensitivity when zero temperature-difference output is approached in making a zero adjustment.

When resistor 10b of temperature sensor 10 is in next-to-perfect adjustment, the output pulses (e.g. 60 to 70 kHz) reaching terminal 29 are—or should be—extremely brief, and therefore they would not activate LED indicator 40 noticeably. To attain maximum sensitivity of the indicator while assuring visible light output during zero adjustment, a pulse extender 41 is included between the gated oscillator-output terminal 29 and the indicator. A fixed or variable pulse-extender may be used to provide prominent response under the marginal conditions of zero adjustment when only a few oscillator pulses comprise each pulse train.

A variable pulse extender is provided in the apparatus represented in the drawing. The pulse extender is effective to turn "on" the LED 40 for a minimum time interval that is long enough to assure visibility in response to only single pulses of oscillator frequency recurring at the rate of the (divided) flow-sensor signal. When a pulse train is generated at each flow-sensor signal, the "on" time of the LED is equal to the minimum extended time interval plus the duration of the pulse train. Schmitt trigger 28 delivers a pulse via blocking diode 42 to discharge capacitor 44 almost instantly, after which the capacitor charges gradually through resistor 46. (When there is a succession of oscillator pulses in each pulse train, charging of capacitor 44 is delayed until the last pulse of the train has passed.) Capacitor 46 is quite small, for assurance that it has been virtually discharged by Schmitt trigger 28 in response to even a single oscillator pulse from comparator 22, for example 12 $\mu$Sec. Capacitor 44 is therefore very small, e.g. 220 pf. Even with a resistor 46 of 10 megohms, the time constant tends to be too short to maintain a visible output from indicator 40. Inverting Schmitt trigger 48 and blocking diode 50 operate to charge capacitor 52 while capacitor 44 remains nearly discharged. The charge on capacitor 52 drains slowly through parallel resistor 54, a time period much longer (e.g. 20 milliseconds) than the short output pulses of comparator 22. Another inverting Schmitt trigger 56 energizes LED indicator 40 so long as capacitor 52 remains sufficiently charged. It follows that the LED indicator will be "on" in response to only a single pulse of oscillator 24 and in response to a pulse train. Only one or two pulses per ramp signal will reach terminal 26 when temperature sensors 10 and 12 produce nearly identical output. The LED indicator will flash in response to each ramp signal for the duration of the minimum time interval of the extended pulse. That interval is increased for a further period when there is a significant temperature difference between the two sensors 10 and 12, giving an impression of greater brightness. Moreover, in normal operation of the heat meter, the frequency of light flashes of the LED will correspond to the rate-of-flow of the water or other fluid. The indicator flashes are thus useful as a check on the fluid flow and on the temperature-sensor adjustment.

Flow detectors are often of the type that produce a pulse in response to each blade of a fluid-activated turbine rotor passing a detector. That would be of such high frequency that the LED would seem to be "on" continuously. Among its other purposes, frequency divider 20 limits the frequency of pulses reaching the LED indicator so that it emits separated flashes even when there is a high flow rate.

Compensation Circuit

It was noted above that oscillator 24 can be made to operate at a frequency that is variable as a function of the temperature at the flow-sensor location, and that amplifier 36 provides a voltage to oscillator 24 that varies in proportion to the temperature changes. For example, the voltage input to amplifier 36 may vary over a range of 1.0 volt for a temperature-difference variation of 0° C. to 100° C. Amplifier 36 may correspondingly have an output that changes from 5 to 10 volts, a 5-volt range for a temperature change of 0° C. to 100° C. The (+) input of comparator 24a in the oscillator has a bias established by a bias resistor network including voltage divider 24f, 24g, modified by the output of amplifier 36 via resistor 24h. Comparator 24 has a feedback loop to its (+) input via resistor 24i. Comparator 24 also has a feedback loop to its (−) input including fixed and adjustable resistors 24b and 24c in series, connected in series with capacitor 24d to ground (d-c negative). A resistor 24e connects the resistor-capacitor circuit 24b-c-d to the (+) d-c supply terminal.

Oscillator 24 produces rectangular waves as the (−) input of comparator 24a rises above and falls below the bias at the (+) terminal. When the output of comparator 24a is low, due to the (−) terminal having risen above the bias potential at the (+) terminal, the output point of comparator 24a is virtually at ground potential and the capacitor starts to discharge. After this discharge has carried the (−) terminal below the potential at the (+) terminal by a discrete differential, the output of the comparator goes high. Its output terminal is biased positively via resistor 24e. Consequently, capacitor 24d develops a progressively increasing charge voltage, terminating when, once again, the potential at the (−) terminal exceeds the bias at the (+) terminal.

The operation of the oscillator at various output voltages of amplifier 36 may be considered. For discussion let it be assumed that the (+) terminal of the comparator is biased near the (+) terminal voltage of the d-c supply. When comparator 24a dries its output to ground, that output drops from near-d-c positive potential. The capacitor was charged to a relatively high voltage, so the capacitor tends to discharge rapidly. After a discrete drop in the capacitor voltage, the comparator turns "on". Due to rapid discharge, the "off" time is short. The capacitor voltage then rises, but because its voltage remained relatively high, it charges slowly, asymptotically.

If it is now considered that the (+) terminal of comparator 24a is biased by amplifier 36 via resistor 24h well below the (+) terminal of the d-c supply, a different operating condition develops. With the comparator switched "high", capacitor 24d charges to a close approximation of the bias at the (+) input of the comparator. Upon switching of the output of comparator 24a to ground potential, capacitor 24d discharges somewhat slower than in the first example, its charge at switchover being at a lower voltage than before. After a somewhat longer discharging time interval than before, the (−) input of the comparator drops by a discrete value below the potential at the (+) input terminal, the output point of the comparator switches "high", and charging of capacitor 24d is resumed. However, the output point of the comparator is at a much higher potential at this time than the capacitor potential, so that recharging tends to be more rapid than in the first condition.

In practice, the following frequency variation of the oscillator occurs as a function of the water temperature at the flow sensor in a practical example:

| % Freq. | 0 | −0.5 | −1.0 | −1.5 | −2.0 | −2.5 | −3.0 | −3.5 |
|---|---|---|---|---|---|---|---|---|
| °C. | 0 | 39.3 | 53.6 | 67.9 | 75.0 | 83.9 | 91.1 | 100 |

From this data, the non-linearity of the frequency change in response to various temperatures is striking. The temperature rises as much as 39.3° C. in causing the first 0.5% frequency change. The temperature rises only 8.9° C. in causing the last 0.5% frequency change. (All percentages are based on the frequency at 0° C.)

The foregoing data was obtained by setting the bias of the (+) input of comparator 24 at 4.4 volts at 0° C. The curvature of the temperature-frequency characteristic can be varied by adjusting the (+) input to other bias voltages at 0° C., to compensate for the resultant effects over a range of temperatures of the change-of-specific-gravity, the change of apparent viscosity of the fluid as it affects the flow sensor, and other temperature-dependent factors.

Truncated Saw-tooth Generator

It was indicated above that frequency divider 20 goes "high" and "low" for alternating intervals. The change from low to high turns on transistor 16a, causes discharge of capacitor 16b and maintains the discharge for a stabilizing time period. During that time interval, the (−) input of comparator 22 allows the comparator output to go high so that the output of oscillator 24 is high. The oscillator would thus operate well in advance of the ramp portion of curve A. However, the "low" output of frequency divider 20 at this time also acts via blocking diode 25 and connection 27 to prevent charging of capacitor 24d, thus blocking the oscillator. Instantly when the output of frequency divider goes "low" and turns-off transistor 16a, thus allowing recharging of capacitor 16b and starting the ramp in curve A, blocking diode 25 frees oscillator 22 to oscillate. The truncated saw-tooth characteristic A avoids inaccuracy that may arise with a saw-tooth wave, where discharge of the ramp-generating capacitor and the start of the recharging phase occur simultaneously.

The frequency divider 20 serves as a generator of rectangular-waves B, in which the ¢low" and "high" output phases can have various durations, as desired. The "low" time interval should be made long enough in relation to the ramp of curve A so that the output of the divider does not go "high" before the ramp voltage rises above the temperature-difference voltage at the inputs to comparator 22, at the maximum flow rate and temperature-difference of the apparatus.

Flow-Meter

The temperature-dependent factors underlying varied flow-meter response to a given volume of fluid flow can be compensated by means of virtually the same circuit as in the heat meter described above. Additionally, if the flow-meter is to indicate mass-rate-of-flow, the compensation can additionally take into account the variations of specific heat of the fluid, e.g. water, at different temperatures. For this purpose, the two-position three-pole switch 60a, 60b and 60c can be shifted from the position shown, in which the apparatus operates as a heat meter, into the other position in which the apparatus serves as a flow-meter. In the changed switch position, the output of frequency divider 20 activates timer 62 for a precise time interval to apply a potential to the (−) input of comparator 22 below that provided at the (+) input by voltage divider 64. During the same interval, connection 27 frees the oscillator to oscillate. The oscillator output reaches frequency divider 66 via switch section 60c to operate flow-rate meter 68 and flow volume indicator 70. The latter may be calibrated as a mass-flow indicator.

As in the heat meter, the temperature sensor at the flow-meter is connected to amplifier 36 so as to adjust the oscillator frequency in accordance with fluid temperature. The oscillator frequency at different temperatures can be modified empirically to compensate for temperature-dependent factors affecting the operation of the flow-meter.

The drawing combines a flow-meter with a heat meter, primarily to emphasize parallels that should be recognized between compensation in the two instruments. The two instruments combined as shown could be used together where required.

The foregoing embodiments of the various features of the invention will be found useful in various modified forms and certain of them may be used without the others, so that the invention should be construed broadly in accordance with its full spirit and scope.

What is claimed is:

1. Heat metering apparatus for a system having a heat exchanger, an inlet passage, an outlet passage and means for moving fluid through said inlet passage, said heat exchanger and said outlet passage serially, said heat metering apparatus including a flow sensor at one of said passages operative to produce a series of pulses in response to fluid flow, a pair of temperature sensors located at said inlet and outlet passages, respectively, temperature difference means for taking the difference between the outputs of said temperature sensors, an oscillator, a heat meter, product-taking means responsive to both said flow sensor and said temperature difference taking means for enabling the oscillator to supply trains of pulses to the heat meter at intervals determined by said flow sensor for durations determined by said temperature difference taking means, and compensating means controlled by the one of said temperature sensors for causing the oscillator frequency to vary to compensate for temperature-related deviations in the response of the flow sensor to the mass-rate of fluid flow.

2. Apparatus as in claim 1, wherein said oscillator is rectangular-wave generator biased for operation in a non-linear portion of its bias-frequency characteristic and wherein said one temperature sensor is connected to said oscillator for modifying the bias and the operating frequency thereof.

3. Apparatus as in claim 1, wherein said oscillator has a resistance-reactance time constant circuit providing varying frequency control for the oscillator in dependence on said one temperature sensor.

4. Apparatus as in claim 1, wherein said oscillator has a resistance-capacitance time constant circuit providing varying frequency control for the oscillator in dependence on said one temperature sensor.

5. Apparatus as in claim 2 wherein said oscillator has a resistance-reactance time constant circuit providing varying frequency control for the oscillator in dependence on said one temperature sensor.

6. Flow metering apparatus including a flow sensor of the type that includes a rotor and in which succession of pulses are produced evidencing the rate of flow, a temperature sensor at the flow sensor for providing output voltage varying as a function of the temperature of the fluid, flow-metering means, an oscillator having a bias connection providing a non-linear bias-frequency characteristic, a gate operable in response to said flow-sensor pulses for coupling said oscillator to said flow metering means for discrete time intervals, and a frequency control connection from said temperature sensor to said bias connection for adjusting the oscillator frequency to compensate for temperature-dependent variations in the operation of the flow sensor.

* * * * *